United States Patent [19]
Takeuchi et al.

[11] Patent Number: 5,953,703
[45] Date of Patent: Sep. 14, 1999

[54] METHOD OF SELECTING LENS COLOR FOR EYEGLASSES

[75] Inventors: Kunie Takeuchi; Ryuto Fujie, both of Himeji; Hiroyuki Fujie, Kobe, all of Japan

[73] Assignee: Paris Miki Inc., Tokyo, Japan

[21] Appl. No.: 08/819,858

[22] Filed: Mar. 17, 1997

Related U.S. Application Data

[63] Continuation of application No. 08/312,628, Sep. 27, 1994, abandoned.

[30]     Foreign Application Priority Data

Oct. 21, 1993 [JP] Japan ................................. 5-285581

[51] Int. Cl.$^6$ .................................................. G06F 17/60
[52] U.S. Cl. ................................................. 705/1; 702/1
[58] Field of Search .............................. 705/1; 434/99, 434/100; 364/526; 702/1, 19, 127

[56]     References Cited

U.S. PATENT DOCUMENTS

| | | | |
|---|---|---|---|
| 3,596,390 | 8/1971 | Scalice | 40/491 |
| 4,160,271 | 7/1979 | Grayson et al. | 364/400 |
| 4,232,334 | 11/1980 | Dyson | 348/77 |
| 4,351,591 | 9/1982 | Stockett | 353/25 |
| 4,434,467 | 2/1984 | Scott | 364/400 |
| 4,561,850 | 12/1985 | Fabbri et al. | 434/98 |
| 4,577,285 | 3/1986 | Bailey | 364/560 |
| 4,909,632 | 3/1990 | McFarlane | 356/402 |
| 5,311,293 | 5/1994 | MacFarlane et al. | . |
| 5,313,267 | 5/1994 | MacFarlane et al. | 356/405 |
| 5,528,431 | 6/1996 | Wilkins | . |
| 5,537,211 | 7/1996 | Dial | . |
| 5,785,960 | 7/1998 | Rigg et al. | . |

Primary Examiner—Robert A. Weinhardt
Attorney, Agent, or Firm—Oblon, Spivak, McClelland, Maier & Neustadt, P.C.

[57]     ABSTRACT

A method of selecting lens colors for eyeglasses. In the method, the colors of the skin, hair lips and pupils of a purchaser of eyeglasses are measured, and the angular positions of the measured colors on a hue circle are determined. Then, hues apart by specified angles from the measured colors are extracted as basic proposed colors. The purchaser is questioned to obtain words expressing an image for the lens color, and a color tone corresponding to each word is retrieved from a color name data base. For each color tone, the number of given words and weight of word are calculated. Further, hues which match the measured colors of the purchaser are determined based on the words. When certain basic proposed colors coincide with the thus determined hues, the numerical points for the certain basic proposed colors are increased. Additionally, it is inspected whether or not the basic proposed colors coincide with the color preference of the purchaser, based on the information of color preferences classified in terms of sex, age, district and country. The numerical points for the basic proposed colors are increased or decreased based on the results of the inspection. Finally, the basic proposed colors are arranged in order of the numerical points, and are presented before the purchaser.

2 Claims, 1 Drawing Sheet

METHOD OF SELECTING LENS COLOR FOR EYEGLASSES

This application is a Continuation of application Ser. No. 08/312,628, filed on Sep. 27, 1994, now abandoned.

BACKGROUND OF THE INVENTION

1. Field of the Invention

The present invention relates to a method of selecting a lens color at the time when eyeglass lenses are colored with a color having transparency during the preparation of the lenses, or at the time when a purchaser selects colored eyeglass lenses.

2. Description of the Related Art

In eyeglass retailers, conventional manner of proposing lens colors to a purchaser is as follows: A salesperson first shows the purchaser color samples which have different dye concentrations depending on manufacturers of eyeglass lenses, and tells the purchaser expected final colors. The selection of color for eyeglass lenses requires a great deal of skill and experience. Further, each salesperson has relied solely on his or her own experience in selecting a lens color which best matches the purchaser.

Since no universal methods have been established for selecting lens colors, as mentioned above, it has been difficult to objectively determine whether or not the selected lens color is suited for the purchaser.

Moreover, salespersons sometimes encounter difficulties in selecting lens colors because of the following reasons. The ranges of usable colors and allowable dye concentrations vary depending on the refractive power or thickness of lenses. Besides, purchasers cannot clearly imagine how the ordered lenses look until the lenses are actually presented before them after colored. When purchasers whose eyesight must be heavily corrected want to have a new eyeglass frame and new colored lenses in combination, they encounter a difficulty in confirming whether or not the new eyeglasses are suited for them because of their eyesight. Namely, even though the purchasers look into a mirror to confirm how they look with new eyeglasses, they see their faces with new eyeglass frames only vaguely because lenses are missing. In addition, with regard to the lens colors, the purchasers have no choice but to imagine them, and therefore, the results are far from the objective judgment.

This sometimes leads to purchasers' dissatisfaction after the ordered eyeglasses have been finished, and in some cases, purchasers had to pay extra money for placing another order and obtaining the eyeglasses which they actually wanted.

As described above, in the conventional method, successful results in selecting colors of eyeglasses depend on the skill and experience of a salesperson. Therefore, an improved method has been desired for achieving selection of lens colors at a sufficiently standardized level by using a universal rule with high adaptability.

SUMMARY OF THE INVENTION

An object of the present invention is to provide an improved method of selecting lens colors of eyeglasses which fit each individual.

The above and other objects, features and advantages of the present invention will be apparent from the following description.

DESCRIPTION OF THE INVENTION AND PREFERRED EMBODIMENTS

Figure 1:
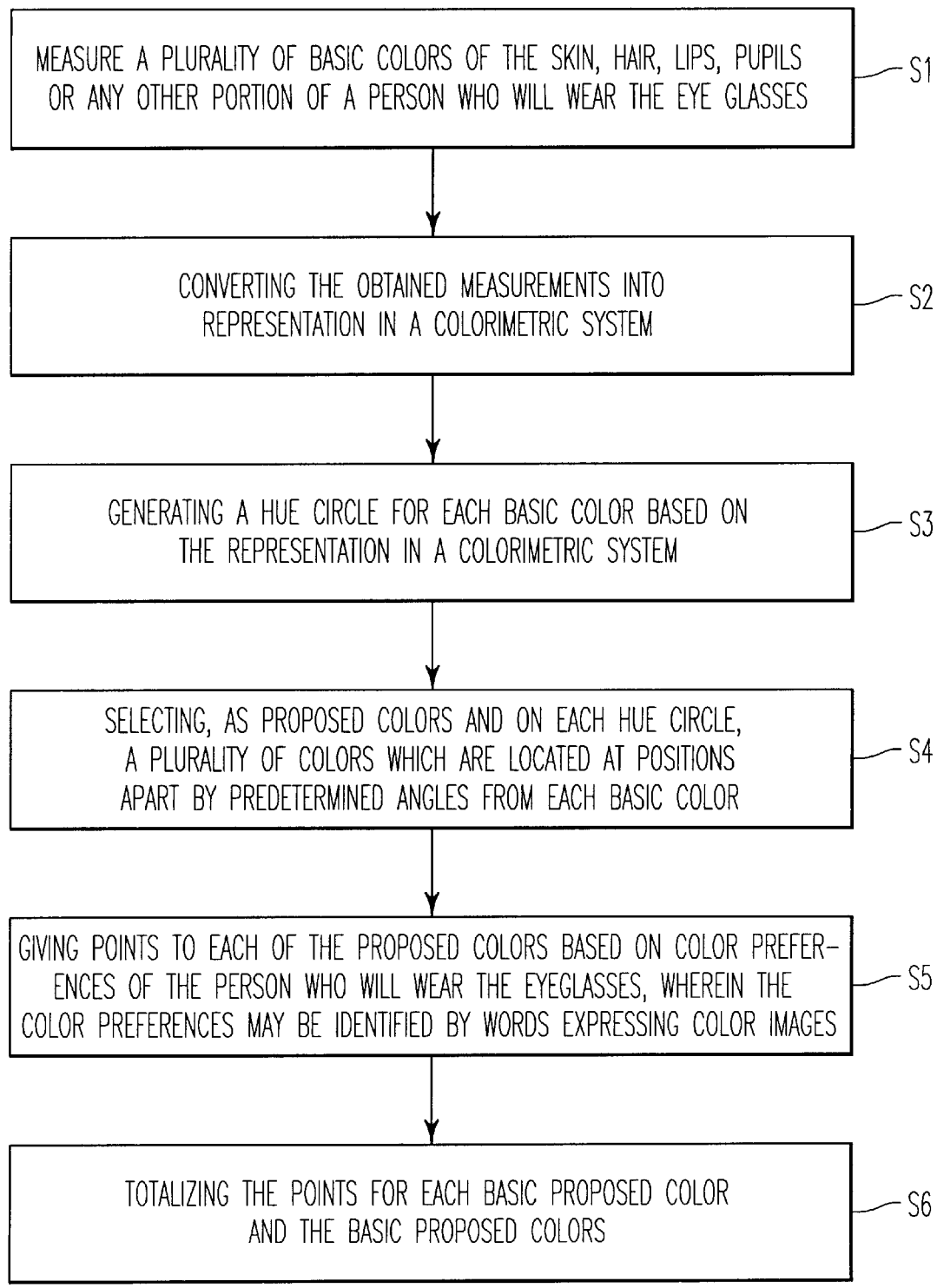
FIG. 1 is a flow chart illustrating the main steps in the method of the present invention.

On each hue circle, a plurality of hues located at positions apart by a specified angle from the unique color of a certain portion of the person are extracted as basic color proposal (step S4). Examples of the hue circles which may be used in the present invention include a PCCS hue circle, Munsell hue circle and Ostwald hue circle.

In the method according to the present invention, colors of the skin, hair, lips and pupils of a person who will wear the eyeglasses are first measured as basic colors using a color measuring device, and measured values are converted into PCCS (Practical Color Coordinate System) values. A hue circle is prepared for each of basic colors based on the PCCS values. Subsequently, there are extracted, as basic proposed colors, a plurality of colors on each of the hue circles, the basic proposed colors being spaced apart by predetermined angles from the basic colors. Moreover, numerical points are determined for each of the basic proposed colors based on the person's color preference. The numerical points for each of the basic proposed colors are summed, and the basic proposed colors are displayed in the order of their summed numerical points.

The PCCS used in the present invention is an improved system based on the Ostwald color system.

The Munsell color solid has a main axis acting as a scale of value (lightness) for achromatic color in which lightness is divided stepwise from black to white. In each step of lightness, plural branches including nodes of Munsell chroma radially extend along a horizontal plane in the directions of so-called Munsell hues. The chromaticness becomes higher as it comes close to the tip of each branch. In the Munsell color solid, classification of colors in terms of hue, lightness and chroma is carried out based on sensation. Therefore, when colors are expressed by numerals in order of colors in the color solid, relation between each color and its numerical representation is not necessarily consistent. JIS (Japanese Industrial Standard) has adopted this Munsell color system.

In the Ostwald color solid, a physicochemical approach is taken for identifying colors. This color solid was widely utilized in Japan previously. In identifying colors, each color is expressed by an amount (V) of full color, an amount (W) of white color and an amount (S) of black color, where the equation $W+S+V=100$ is always met.

In the above-described Ostwald color solid, eight colors starting from yellow are used as primary hues, each of which is further divided into three, thereby obtaining twenty-four full colors (V) in total. The amounts of white and black colors are each determined by geometric series according to Waber Fechner's law, and expressed by alphabets a to z (except j).

Using the above-mentioned Waber Fechrier's law, the Ostwald color solid is formed based on the reflectance of each color. However, since the Ostwald's full colors are fixed, full colors which are not included in the Ostwald color solid but actually exist cannot be defined. DIN (Deutsche Industrie Normenausschuss) provides DIN color chips as a modified version of this color solid.

In general, the Munsell color atlas is excellent in teaching us the meanings of the color specification and the equi-rate color space, whereas the Ostwald color chips are excellent in assisting selection of harmonized colors.

After the modified Munsell system was adopted in JIS as Z8721 in 1958, Nippon Shikisai Kenkyusho (the Japan Color Laboratory Foundation) developed the PCCS (Practical Color Coordinate System) hue circle in 1964 as effective in the education of colors and selection of harmonized colors.

In the PCCS hue circle, the subtractive primaries and the additive primaries are disposed at equal intervals, and the scale of lightness is determined so as to be in agreement with the Munsell value. The PCCS hue circle has a skeleton composed of hue, lightness and chroma. The feature of this hue circle is a hue-tone system in which all colors are classified by only two parameters, i.e., the hue and the tone, by which mutual relationship among the colors can be grasped. With this feature, this system is actively used for color education, color plans in industrial fields, color selection in the fields of design and marketing as well as in computers graphics.

In the present invention, a color name data base, which specifies combinations of hue/lightness/chroma corresponding to image words usually used by purchasers for describing images of lens colors, is prepared in advance.

Each purchaser is questioned to obtain an image of a lens color in a plurality of words. Based on the information of these words, a tone or tones which correspond to the words, and each of which is specified by hue, lightness and chroma, are searched from the color name data base.

The number of words which were collected for each color tone and the weight given to each words are converted into numerical points (step S5). The numerical points thus obtained are summed up for each color tone.

For each image word, a relative angular position on the hue circle is predetermined to obtain a color coordination or color matching expressed by the word. Then, based on a plurality of hues corresponding to each purchaser's unique colors, relative angular positions on the hue circle, which correspond to the obtained words and represent hues for color matching, are determined, and compared with the angular positions of the basic proposed colors previously extracted. Thus, when the relative angular position of each hue corresponding to each word coincides with one of the positions of the for basic proposed colors, the numerical point of the corresponding basic proposed color is further added with a predetermined numerical point.

The color name data base contains color preferences as classified in terms of sex, age, district and country, and each color is specified by hue, lightness and chroma. By comparing the color information in the data base with the above-described basic proposed colors, it is inspected whether or not the proposed colors coincide with the color preference of the purchasers. Based on the results of the inspection, the numerical points for the proposed colors are further added with or subtracted by a predetermined numerical points.

As described above, a color tone is specified by image words for each of the hues extracted. Then, color arrangements among the hues and the basic proposed colors are determined based on the words. In addition, color preferences due to the sex, age, district and country of the purchaser are inspected to obtain the final numerical points for the respective basic proposed colors.

The basic proposed colors are then placed side by side in order of the magnitude of the numerical points. As a result, the basic proposed colors line up in order of fitness from the color of best fit to the color of least fit. Consequently, colors in high ranks are selected as lens colors which matches the purchaser (step S6).

In the PCCS hue circle, the three primary material colors and three primary light colors are arranged in equal intervals, and twenty-four colors are defined based on reflectance. This makes computerization with ease. Further, since the scale of lightness corresponds to the Munsell value, conversion into the RGB calorimeter system is also easy.

A preferred embodiment of the present invention will now be described by way of an example.

Colors of the skin, hair, lips and pupils of a purchaser of eyeglasses in need of a proposal for a lens color are measured by a colorimeter. Assuming that the measured colors are 6.5YR (skin), 10.0Y (hair), 7.0R (lips), and 5.0Y (pupils) on the PCCS hue circle. Subsequently, complementary colors located opposite to, that is, apart by 180° from the positions of the above colors are determined.

Similarly, hues at positions apart by 0°, 15°, 30°, 90°, 120°, 240°, 270°, 330° and 345° from each of the positions of the colors of the skin, hair, lips and pupils are extracted. As a result, ten hues including the opposite hue at the 180° position are determined for each of the skin, hair, lips and pupils. In other words, forty hues in total are extracted for the colors of the skin, hair, lips and pupils, and served as the basic proposed colors.

Next, the purchaser is questioned to obtain an image for a lens color in a plurality of words. These words are adjectives, such as "soft" or "warm". A color name data base, which specifies the hue/lightness/chroma corresponding to each of image words usually used by purchasers to describe the coloring of the eyeglass lens, is previously prepared. Thus, on the basis of this color name data base, a color tone, namely, a combination of lightness and chroma, which corresponds to each word used by the purchaser is retrieved.

For example, in the case where the word "soft" or "warm" is used by the purchaser, a color tone corresponding to the word "soft" or "warm" is retrieved from the color name data base. Then, the number of the words obtained for a certain range of lightness and chroma, in other words, the number of the words obtained for each color tone, and weights to be given to the words are treated as numerical points and summed up for each color tone.

The color name data base contains three groups of information, which are a group of image words, a group of numerical information for specifying colors by hue, lightness and chroma, and a group of idiomatic color names, that is, names of colors generally used. Each member of the three groups links with each other. Namely, the color name data base has a structure such that, when a word used by the purchaser is given, numerical information of hue/lightness/chroma regarding a certain color and an idiomatic color name related to the word can be retrieved.

On the contrary, when an idiomatic color name is given, numerical information of hue/lightness/chroma regarding a certain color, and one or more image words related to the idiomatic color name can be searched. Furthermore, if numerical information specifying hue/lightness/chroma of a certain color is given, one or more image words and one or more idiomatic color names are retrieved.

In the procedure of the present invention, both the hues of the colors which characterize the purchaser and the hues located at positions apart by specified angles from each of the above hues on each auxiliary hue circle are used as the hues of the basic proposed colors. Subsequently, by questioning each purchaser to obtain an image word for a lens color, a color tone which is defined by a range of lightness/chroma corresponding to the image color is retrieved from the color name data base.

Each image word has a color psychological relationship to each color tone. For example, the image of the word "soft"

can be expressed by a light color tone, and the image of the word "sober" can be expressed by a dark color tone. The words are defined one by one and constitute the color name data base.

In the process of correlating a plurality of the words with color tones, it often happens that one word is converted into a plurality of color tones. In this case, the number of words converted for each tone is weighted, and the numerical point for each color tone is added with the weighted value. The numerical points thus obtained are summed up for each color tone. As a result, although determination of a color tone for each of the above-described proposed colors is carried out based on each image word, a plurality of colors with different tones in the same hue level of the basic proposed color may be selected in the case where the image word is converted to a plurality of tones.

Further, in the case where a plurality of words express a similar image, a same color tone is repeatedly specified, and accordingly, the numerical point of the specified tone is increased according to the number of words. Thus, even when a plurality of tones are selected for a certain basic proposed color, they are put in order by their numerical points, which have been increased based on the number of the words expressing the tones, thus enabling the ranking of the above-described basic proposed colors.

Next, for each image word, a standard hue difference on the hue circle is determined based on the image word, and the standard hue difference thus determined is put in the above-described data base as information of relative angular positions. For example, when a color coordination or color matching between the color of the skin and a lens color is determined based on the word "vivid", a relative angular position of the word "vivid" with respect to the color of the skin, that is, a hue difference corresponding to the word is specified for color coordination. Data of the standard hue differences are also put in the color name data base. Subsequently, the angular positions of the hues which are specified by the image words for color coordination are compared with the angular positions of the basic proposed colors. When the position of certain hues of the basic proposed colors corresponds to the angular positions of the hues specified by the words for color coordination, the numerical points for the certain hues are increased.

Namely, by the use of image words, a color tone of the hue which is apart by a specified angle from the color which characterizes the purchaser such as the color of the skin is specified, and simultaneously, the color matching to the colors of the skin or the like can be made.

The color name data base, as described above, is constituted by the relationship between a plurality of image words for lens color and color tones, the relative positions of hues on a hue circle, which are expressed by the words for color coordination or color matching, and information regarding the color preferences classified by the sex, age, district and country.

The basic proposed colors, the numerical points of which have been calculated as described above, are individually retrieved from the color name data base, and are compared with the above-described color preferences and the like. When certain basic proposed colors coincide with the color preferences, the predetermined points are added to each of the numerical points for the certain basic proposed colors. On the other hand, when they do not coincide with the color preferences, their numerical points are subtracted by a predetermined amount. Further, in the case where a color is found to be a taboo color for a specific country, it is removed from the basic proposed colors.

After the addition and subtraction of the numerical points in the above procedure, the final numerical points are obtained for each of the basic proposed colors. At this time, the numerical points are calculated based on the relative positions of hues expressed by image words with respect to hues corresponding to colors characteristic of each purchaser, and tones indicated by the image words selected by the purchaser, using different weighting factors for judgments in different aspects. Accordingly, when certain basic proposed colors are found to satisfy conditions in aspects for which high weighting factors are given, those basic colors are considered to have a high precedence and high adaptability.

However, when a purchaser designates his or her favorite color line, the highest weighting factor is given if the color preferences and the basic proposed colors are in agreement, to finalize calculation of the numerical points.

A plurality of colors extracted in the above-described procedure are arranged in order of the numerical points, and colors in upper ranks are proposed as proposed lens colors.

Although a lens color is selected for eyeglasses on the obscure standard and individual experimental rules in the past, the method according to the present invention makes it possible to propose lens colors on the basis of clear and universal rules. Therefore, customer satisfaction can be achieved.

According to the present invention, even when an operator is not a specialist on colors, the operator can easily select proper colors for lenses of eyeglasses. Since there are a huge number of colors, it is difficult for ordinary persons to even select basic colors. In the present invention, proposed colors are selected from hue circles created based on a plurality of basic measured colors, so that proper kinds of proposed colors can be obtained in a proper number. Subsequently, numerical points are imparted to each of the thus-obtained proposed colors based on the person's color preference. The proposed colors are displayed in the order of the numerical points. Therefore, the selection of a lens color can be facilitated.

When it is attempted to select proposed colors without using hue circles (unlike the present invention), the number of the proposed colors will become excessively large or excessively small, which makes a subsequent final selection difficult. Since obtaining a proper number and proper kinds of proposed colors as in the present invention is very important for selection of a lens color, the selection of proposed colors using the hue circles of basic colors is one of the important features of the present invention.

What is claimed is:

1. A method of assisting in the selection of a lens color for eyeglasses, comprising the steps of:

measuring, as basic colors and using a calorimeter, colors of the skin, hair, lips and pupils of a person who will wear the eyeglasses and converting measured values into PCCS (Practical Color Coordinate System) values;

making a hue circle for each of the basic colors based on the PCCS values; and extracting, as basic proposed colors, a plurality of colors on each of the hue circles, the proposed colors being apart by predetermined angles from the corresponding basic color.

2. A method of assisting in the selection of a lens color for eyeglasses, comprising the steps of:

measuring, as basic colors and using a calorimeter, colors of the skin, hair, lips and pupils of a person who will wear the eyeglasses and converting measured values into PCCS (Practical Color Coordinate System) values;

making a hue circle for each of the basic colors based on the PCCS values;

extracting, as basic proposed colors, a plurality of colors on each of the hue circles, the basic proposed colors being apart by predetermined angles from the corresponding basic color; imparting numerical points to each of said basic proposed colors based on the person's color preference; and summing the numerical points imparted to each of said basic proposed colors and displaying the basic proposed colors in the order of the summed numerical points.

* * * * *